(12) United States Patent
Spracklen et al.

(10) Patent No.: US 11,842,209 B2
(45) Date of Patent: Dec. 12, 2023

(54) HIGH-PERFORMANCE PROCESSING IN A VIRTUALIZATION ENVIRONMENT

(71) Applicant: VMware, Inc., Palo Alto, CA (US)

(72) Inventors: Lawrence Spracklen, Boulder Creek, CA (US); Hari Sivaraman, Livermore, CA (US); Vikram Makhija, Sunnyvale, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 366 days.

(21) Appl. No.: 16/242,275

(22) Filed: Jan. 8, 2019

(65) Prior Publication Data
US 2019/0138344 A1 May 9, 2019

Related U.S. Application Data

(63) Continuation of application No. 13/909,743, filed on Jun. 4, 2013, now Pat. No. 10,180,852.

(51) Int. Cl.
*G06F 9/455* (2018.01)

(52) U.S. Cl.
CPC ................ *G06F 9/45558* (2013.01)

(58) Field of Classification Search
CPC .................................... G06F 9/45558
See application file for complete search history.

(56) References Cited

U.S. PATENT DOCUMENTS

| | | | |
|---|---|---|---|
| 7,484,208 B1 | 1/2009 | Nelson | |
| 7,945,436 B2 | 5/2011 | Ang et al. | |
| 8,146,082 B2 | 3/2012 | Belay | |
| 2006/0230407 A1 | 10/2006 | Rosu et al. | |
| 2009/0119087 A1 | 5/2009 | Ang et al. | |
| 2009/0144510 A1 | 6/2009 | Wibling et al. | |
| 2010/0017519 A1* | 1/2010 | Han .................. | H04W 4/02 718/1 |

(Continued)

OTHER PUBLICATIONS

Ravi et al., Supporting GPU Sharing in Cloud Environments with a Transparent Runtime Consolidation Framework, HPDC'11 Proceedings of the 20th International Symposium on High Performance Distruted Computing, Jun. 8-11, 2011, San Jose, California, pp. 217-228.

(Continued)

*Primary Examiner* — Sisley N Kim
(74) *Attorney, Agent, or Firm* — Dinsmore & Shohl LLP (57) ABSTRACT

Exemplary methods, apparatuses, and systems include a client virtual machine processing a system call for a device driver to instruct a physical device to perform a function and transmitting the system call to an appliance virtual machine to execute the system call. The client virtual machine determines, in response to the system call, that an established connection with the appliance virtual machine has switched from a first protocol to a second protocol, the first and second protocols including a high-performance transmission protocol and Transmission Control Protocol and Internet Protocol (TCP/IP). The client virtual machine transmits the system call to the appliance virtual machine according to the second protocol. For example, the established connection may switch to the second protocol in response to the client virtual machine migrating to the first host device from a second host device.

19 Claims, 5 Drawing Sheets

(56) References Cited

U.S. PATENT DOCUMENTS

| | | | |
|---|---|---|---|
| 2010/0149194 A1* | 6/2010 | Yu | G06F 8/41 |
| | | | 345/522 |
| 2011/0134111 A1* | 6/2011 | Stone | G06F 9/45541 |
| | | | 345/419 |
| 2011/0184993 A1* | 7/2011 | Chawla | G06F 16/182 |
| | | | 718/1 |
| 2012/0254439 A1* | 10/2012 | Yamasaki | G06F 9/505 |
| | | | 709/226 |
| 2013/0191826 A1 | 7/2013 | Heninger et al. | |
| 2013/0332678 A1* | 12/2013 | Fitzpatrick | G06F 12/00 |
| | | | 711/147 |
| 2014/0184622 A1* | 7/2014 | Xia | G06T 1/20 |
| | | | 345/522 |
| 2014/0208329 A1 | 7/2014 | Abali et al. | |

OTHER PUBLICATIONS

Cloud Gaming—Gaming as a Service (GaaS), NVIDIA GRID, NVIDIA, Copyright 2013 NVIDIA Corporation, dowloaded at : http://www.nvidia.com/object/cloud-gmaing.html on Apr. 9, 2013, 2 pages.

Duato et al., Enabling CUDA Acceleration within Virtual Machines using rCUDA, IEEE, 2011, 10 pages.

Duato et al., Performance of CUDA Virtualized Remote GPUs in High Performance Clusters, 2011 International Conference of Parallel Processing, IEEE 2011, pp. 365-374.

Gupta et al., GViM: GPU-accelerated Virtual Machines, 3rd Workshop on System-level Virtulization for High Performance Computing (HPCVirt'09) Mar. 31, 2009, Nuremberg, Germany, 8 pages.

Gupta et al., Pegasus: Coordinated Scheduling for Virtualized Accelerator-based Systems, USENIX ATC '11: 2011 USENIX Annual Technical Conference, USENIX Association, pp. 31-44.

Huang et al., A case for High Performance Computing with Virtual Machines, ICS'06 Jun. 28-30, Cairns, Queensland, Australia, Copyright 2006 ACM.

Merritt et al., Shadowfax: Scaling in Heterogeneous Cluster Systems via GPGPU Assemblies, VTDC'11, Jun. 8, 2011, San Jose, California, USA Copyright 2011 ACM, 8 pages.

NVIDIA CPUDirect, NVIDIA Developer Zone, Copyright 2013 NVIDIA Corporation, downloaded at https://developer.nvidia.com/gpudirect on Apr. 9, 2013, 3 pages.

Shi et al., vCUDA: GPU Accelerated High Performance Computing in Virtual Machines, IEEE 2009, 11 pages.

\* cited by examiner

HIGH-PERFORMANCE PROCESSING IN A VIRTUALIZATION ENVIRONMENT

RELATED APPLICATIONS

This application is a continuation of U.S. application Ser. No. 13/909,743, filed on Jun. 4, 2013, and published as U.S. 2014/0359614, the entire contents of which is incorporated by reference herein.

FIELD OF THE INVENTION

The various embodiments described herein relate to the virtualization of a physical device. In particular, embodiments relate to switching between communication protocols used in a connection between a client virtual machine and an appliance virtual machine in the virtualization of the physical device.

BACKGROUND OF THE INVENTION

Virtualization environments provide multiple virtual machines (VM's) on a physical "host" machine, with each VM appearing to be a full computer to "guest" software running inside the VM. Virtualization software (e.g., a hypervisor) enables a user to concurrently run multiple copies of a guest operating system on one physical machine, with each guest operating system having its own copy of "virtual hardware." For example, a virtualization environment may virtualize a physical device using a split driver model. A front end driver within a VM advertises itself to the guest software, accepts system calls from the guest software, and routes the requests to a back end driver within the hypervisor. The back end driver translates and forwards the system calls to a vendor driver associated with the physical device.

The abstraction provided by the virtualization and split driver model enables multiple VM's to share a single physical device while enabling a VM to be migrated from one host machine to another host machine. The split driver solution, however, suffers overhead costs of the translation performed by the back end driver and is limited to those physical devices that have custom drivers for virtualization software. To avoid translation overhead and the limitation posed by custom drivers, a physical device may be exposed directly to a VM via "guest device pass-through." Guest device pass-through, however, involves a one-to-one binding between the physical device and the VM while complicating or preventing migration of the VM bound to the physical device.

SUMMARY OF THE INVENTION

Exemplary methods, apparatuses, and systems include a client virtual machine processing a system call for a device driver to instruct a physical device to perform a function and transmitting the system call to an appliance virtual machine to execute the system call. The client virtual machine determines, in response to the system call, that an established connection with the appliance virtual machine has switched from a first protocol to a second protocol, the first and second protocols including a high-performance transmission protocol and a low-performance transmission protocol. The client virtual machine transmits the request to the first appliance virtual machine according to the second protocol. For example, the established connection may switch to the second protocol in response to the client virtual machine migrating to the first host device from a second host device.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein virtualize a hardware device for client virtual machines (VM's) by transmitting system calls related to the hardware device to an appliance VM. The appliance VM utilizes guest device pass-through and a standard device driver to avoid translation overhead and the limited hardware selection posed by custom drivers. The client VM's remain able to migrate from a first host device to a second host device. A client VM utilizes a high-performance transmission protocol to communicate with the appliance VM, e.g., when co-located within or migrated to the same host device as the appliance VM. Otherwise, the client VM utilizes a low-performance transmission protocol to communicate with the appliance VM, e.g., when located in or migrated to a different host device than the appliance VM.

Figure 1:
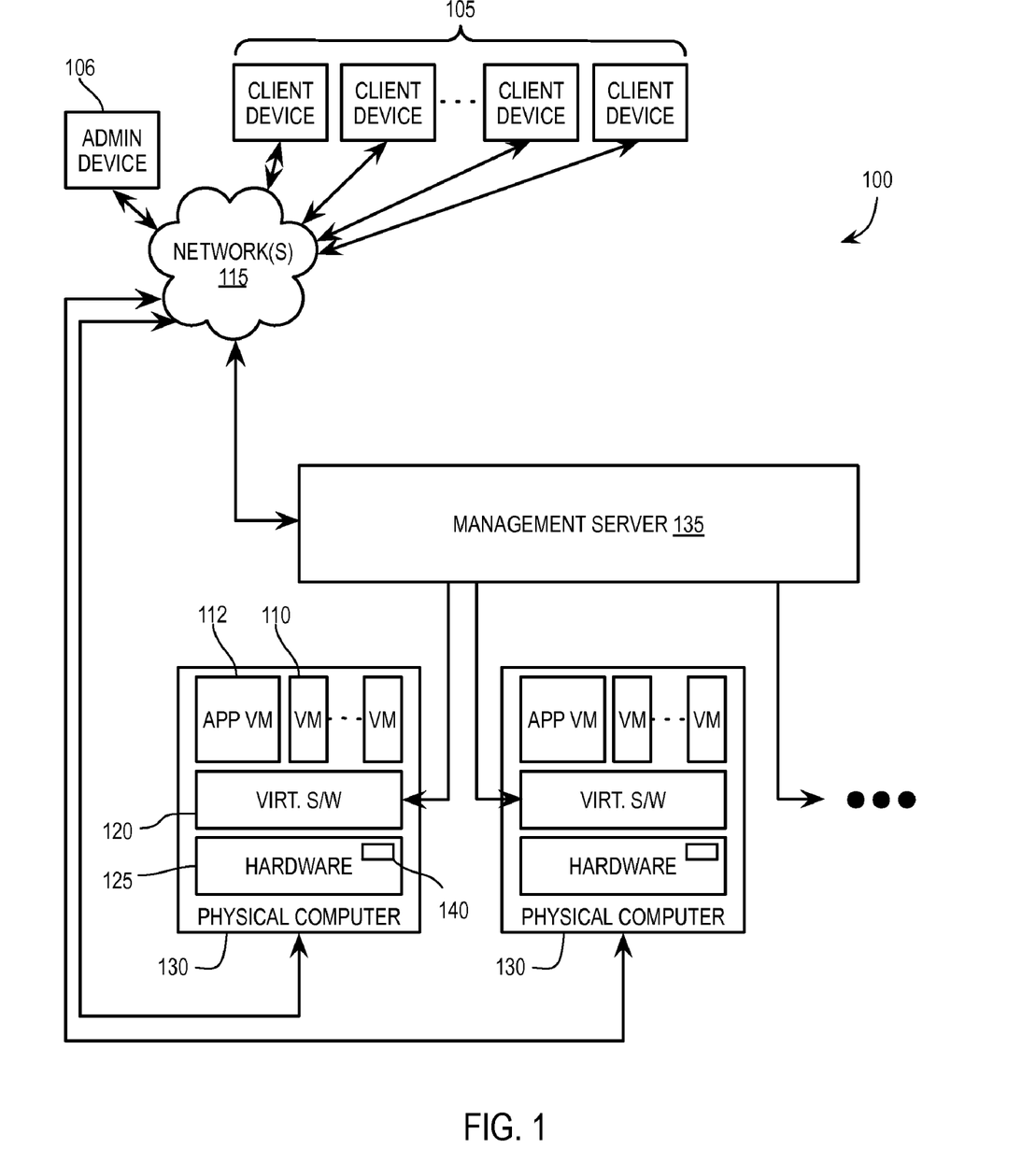
FIG. 1 illustrates, in block diagram form, an exemplary virtual desktop infrastructure environment including one or more processing systems to implement virtualization of a physical device for one or more virtual desktops.

FIG. 1 illustrates, in block diagram form, an exemplary virtual desktop infrastructure environment 100 including one or more processing systems to implement virtualization of a hardware device for one or more virtual desktops. Server-based computing in a VDI environment allows client devices 105 to access centrally-managed user virtual desktops, such as those implemented by client VM's 110 running in a datacenter, via network(s) 115 (e.g., a local area network or other private or publically accessible wide area network, such as the Internet). For example, client device 105 and client VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by client VM 110.

The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client device 105. A virtualized desktop may export user interfaces, e.g., keyboard and mouse input, audio and visual output, to client device 105 from client VM 110 running remotely (in a datacenter) or locally on client device 105, or, in some cases, using a hybrid. Client device 105 transmits user input, e.g., keyboard or mouse input, to client VM 110 to be processed, and receives display and other data, such as sound, from client VM 110 for presentation to a user of client device 105. Client device 105 presents a bitmap representation of the desktop generated by client VM 110. Input to and output from the virtualized desktop are reflected in the bitmap representation on client device 105 as it occurs on the virtualized desktop within client VM 110.

Client VM's 110 are complete computation environments, containing virtual equivalents of the hardware and system software components of a physical system and are typically implemented by an extensive virtualization infrastructure, which includes a variety of software and hardware components. Virtualization software layer 120 (e.g., a hypervisor) running on hardware 125 of physical computer (e.g., host device) 130 manages one or more client VM's 110. Virtualization software layer 120 manages physical resources, e.g., hardware 125, as well as maintains virtual-to-physical hardware mappings.

Management server 135 is responsible for provisioning and maintaining the multitude of client VM's 110 implemented across one or more physical computers (hosts) 130. Management server 135 also provides a software interface to enable an administrator, e.g., via admin device 106, to access and manage client VM's 110.

One or more host devices 130 further include an appliance VM 112. Appliance VM 112 provides virtualization of hardware device 140 in cooperation with one or more client VM's 110. As will be described in further detail below, client VM's 110, in response to a system call from software running within the respective client VM 110, transmit the system calls related to hardware device 140 to appliance VM 112. Appliance VM 112 utilizes guest device pass-through and a standard device driver to process the system calls, avoiding translation overhead and the limited hardware selection posed by custom drivers. By utilizing appliance VM 112, client VM's 110 remain able to migrate between host devices 130. VM migration is described, e.g., in U.S. Pat. No. 7,484,208, which is incorporated by reference in its entirety.

Figure 2:
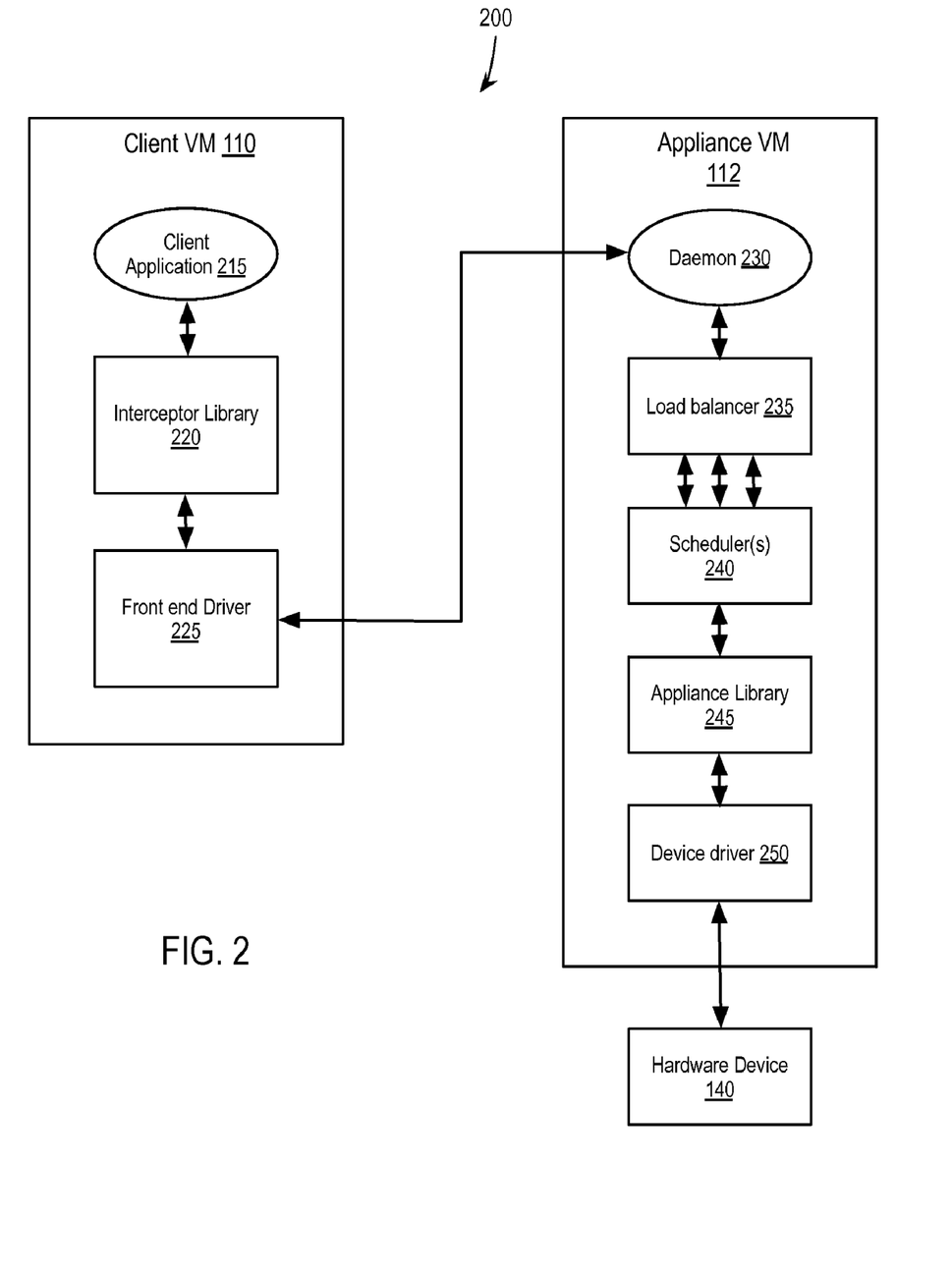
FIG. 2 illustrates, in block diagram form, an exemplary flow path of a system call between a client virtual machine and an appliance virtual machine.

FIG. 2 illustrates, in block diagram form, an exemplary flow path 200 of a system call between client VM 110 and appliance VM 112. Flow path 200 will be described with reference to the methods illustrated in FIGS. 3 and 4.

Figure 3:
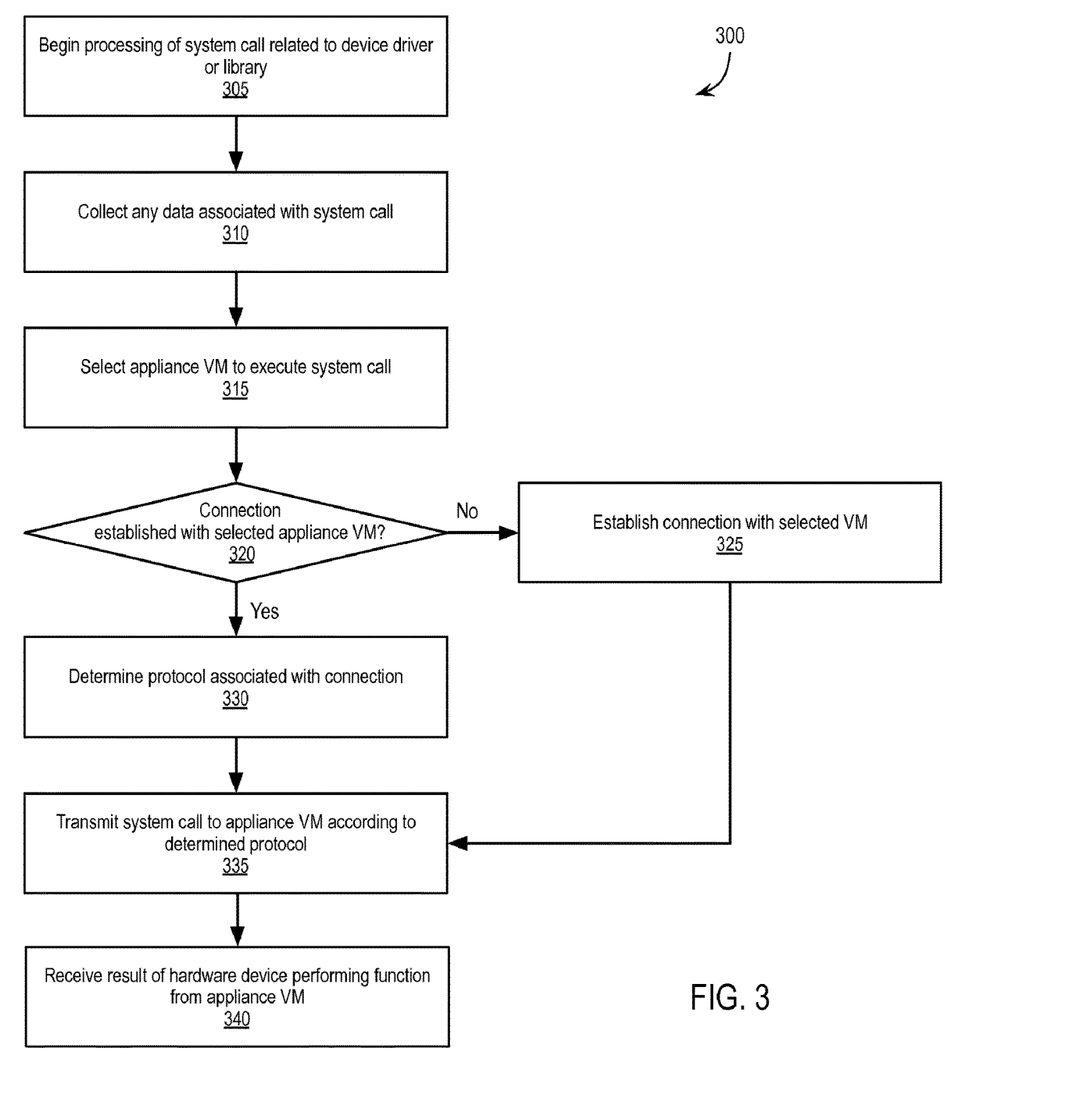
FIG. 3 is a flow chart illustrating an exemplary method of a client virtual machine virtualizing the physical device.

FIG. 3 is a flow chart illustrating an exemplary method 300 of client VM 110 virtualizing hardware device 140. While method 300 is described with reference to client VM 110, part or all of method 300 may be performed by virtualization software 120 and/or in cooperation with another VM 110. Additionally, specific examples are provided with reference to the virtualization of a GPGPU or co-processor. Other hardware devices 140, however, may be virtualized according to the embodiments described herein.

At block 305, client VM 110 begins processing a system call from client application 215 related to a device driver or library. For example, the system call may be a request (e.g., defined by Compute Unified Device Architecture (CUDA™), Open Computing Language (OpenCL™), or a similar parallel computing framework) for a device driver to instruct a general-purpose graphics processing unit (GPGPU) or co-processor to perform an action. As used herein, the phrase "system call" refers to a request from an application at any point of processing prior to execution by hardware device 140. For example, a request that has been processed by a device driver and temporarily stored in a graphics processing unit (GPU) register for execution is referred to herein interchangeably as "the request" and "the system call."

At block 310, client VM 110 collects any data associated with the system call. In one embodiment, the operating system within client VM 110 directs the system call to interceptor library 220. For example, the system call may be intended by client application 215 to be directed to a particular computing framework library, such as a CUDA™ library. VM 110 (via the operating system or linker/loader) may recognize that the system call is intended for the particular library and, as a part of the virtualization, direct the system call to interceptor library 220 instead of to the particular computing framework library (e.g., if the computing framework library is present within VM 110 or virtualization software 120). Interceptor library 220 collects the associated data, and/or a corresponding memory location that can be shared, and passes the data/shared memory location along with the system call to front end driver 225. For example, the system call may reference a virtual memory location storing data to be collected and processed by hardware device 140. In one embodiment, interceptor library 220 is implemented within client VM 110. Alternatively, interceptor library 220 is implemented within virtualization software 120 in a manner that is transparent to client VM 110. In yet another embodiment, the system call is not originally intended for a particular computer framework library and passed directly to front end driver 225. Front end driver 225 may then collect any data associated with and/or otherwise process the system call.

At block 315, client VM 110 (or virtualization software 120) selects appliance VM 112 to execute the system call. In one embodiment, the selection of appliance VM 112 is based upon referencing a configuration or listing of one or more appliance VMs 112 (and corresponding hardware devices 140) available to client VM 110. For example, a user of client device 105 or an administrator using admin device 106 may manually configure client VM 100. Alternatively, a directory services process, the operating system, or a daemon running within client VM 110 maintains a list of available appliance VMs 112 (and corresponding hardware devices 140), e.g., provided by management server 135 and/or generated/maintained by VM 110. In yet another embodiment, client VM 110 queries another VM 110 responsible for maintaining directory services for appliance VM 112.

In an embodiment in which multiple hardware devices 140 are available, client VM 110, management server 135, or a directory services VM 110 selects appliance VM 112 based upon one or more of a previous use of appliance VMs 112, previously established communication protocols used to communicate with appliance VMs 112, load balancing between available appliance VMs 112, latency in response from appliance VMs 112, and/or co-location within the same host device 130 as client VM 110.

At block 320, client VM 110 (or virtualization software 120) determines if a connection has been established with the selected appliance VM 112. If not, a connection is established at block 325. In establishing a connection, client VM 110 determines a transmission protocol to be used to communicate with the selected appliance VM 112. For example, client VM 110 may attempt to connect to the selected appliance VM 112 using a high-performance transmission protocol (e.g., virtual machine connection interface (VMCI), remote direct memory access (RDMA), virtual RDMA, or other zero copy/shared memory protocol). If client VM 110 is unsuccessful in establishing a high-performance transmission protocol connection with appliance VM 112, client VM 110 establishes a connection utilizing a low-performance transmission protocol (e.g., Transmission Control Protocol and Internet Protocol (TCP/IP), User Datagram Protocol (UDP), or comparable protocol) with appliance VM 112. While described herein as high-performance and low-performance transmission protocols, embodiments described herein may establish or switch between transmission protocols based simply upon the ability of client VM 110 to communicate with appliance VM 112. For example, a first transmission protocol may be used when client VM 110 and appliance VM are co-located on the same physical host (and can use extremely high-performance communication techniques that take full advantage of that locality), while a second transmission protocol may be used when client VM 110 and appliance VM 112 are separately located, but exist within the same datacenter, cluster, or other defined grouping of devices. One transmission protocol does not necessarily need to be of "lower performance" than another transmission protocol. In one embodiment, supporting high and low-performance transmission protocol connections enables client VM 110 to switch between available appliance VM's 112 and hardware devices 140, whether local or remote to host device 130 for VM 110, and provides support for multiple types of hardware devices 140.

If a connection has been previously established, at block 330, client VM 110 (or virtualization software 120) determines the protocol associated with the established connection. In one embodiment, client VM 110 attempts to communicate with appliance VM 112 using the communication protocol used in the most recent communication with appliance VM 112. Alternatively, client VM 110 attempts to use a high-performance transmission protocol by default after a period of time has passed after the most recent communication with appliance VM 112, in response to the migration of client VM 110, in response to the migration of appliance VM 112, or in response to a changed setting within client VM 110 or host device 130. For example, client VM 110 may determine that a high-performance connection has failed or otherwise that an established connection with appliance VM 112 has switched or is to be switched from a high-performance transmission protocol to a low-performance transmission protocol in response to client VM 110 migrating to a different host device 130 than the host device 130 for appliance VM 112. Furthermore, client VM 110 may determine that an established connection with appliance VM 112 has switched from a low-performance transmission protocol to a high-performance transmission protocol in response to client VM 110 migrating to the same host device 130 as the host device 130 for appliance VM 112. Alternatively, the connection may switch between a high-performance transmission protocol and a low-performance transmission protocol in response to a changed setting within client VM 110, a changed setting within host device 130, to maintain high availability of connections (e.g., if a high-performance connection fails, the client VM 110 switches to a low-performance connection), or to alternate between high-performance and low-performance connections to maximize bandwidth. In one embodiment, some low-bandwidth signaling may be always transmitted via the low-performance connection, irrespective of whether the high-performance connection is established. For example, the low-performance connection may be maintained while the high-performance connection is used to supplement the low-performance connection when feasible. Additionally, embodiments are not limited to two types of connections. Following the example of switching transmission protocols to maintain high availability, if one protocol were to fail, client VM 110 may attempt to switch to a second protocol, to a third protocol, and so on until a successful connection is made.

At block 335, client VM 110 (or virtualization software 120) packetizes the system call and any associated data according to the determined/established communication protocol and transmits the packets to appliance VM 112. Appliance VM 112 executes the system call, e.g., as will be described with reference to FIG. 4. At block 340, client VM 110 optionally receives from appliance VM 112 the result of appliance VM 112, and its corresponding hardware device 140, executing, processing, or otherwise performing a function related to the system call and stores the result and/or returns the result to client application 215.

Figure 4:
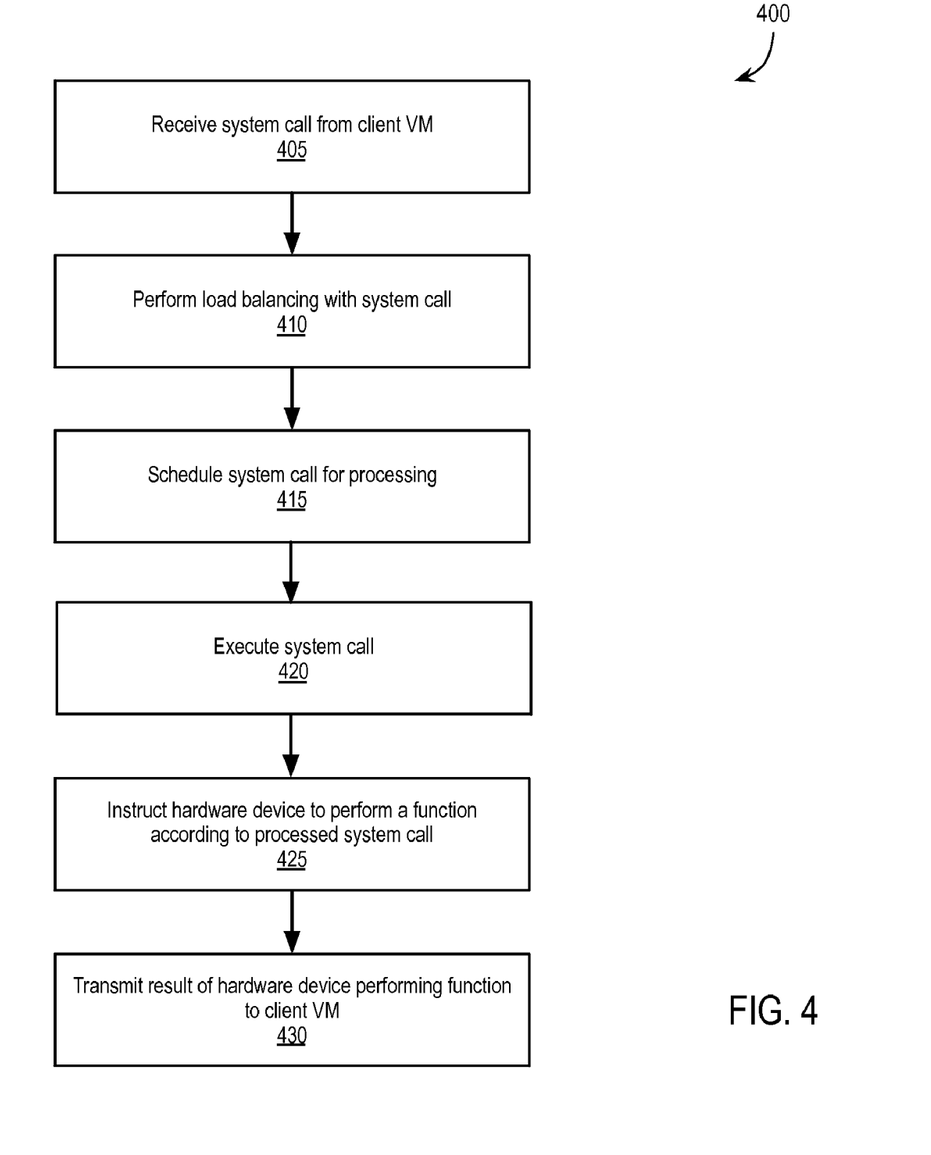
FIG. 4 is a flow chart illustrating an exemplary method of an appliance virtual machine virtualizing the physical device.

FIG. 4 is a flow chart illustrating an exemplary method 400 of appliance VM 112 virtualizing hardware device 140. At block 405, appliance VM 112 receives a system call, and any associated data, from client VM 110. Continuing with the example described above, hardware device 140 may be a GPGPU or co-processor and the system call may be a CUDA™ or OpenCL™ request. In one embodiment, appliance VM 112 includes daemon 230 to unpack the received packets and fork a new process to handle the system call or to pass the system call to an existing process.

At block 410, appliance VM 112 optionally performs load balancing with the system call. For example, load balancer 235 may balance multiple processes received from one or more client VMs 110 and/or distribute the processes between one or more schedulers 240 and/or hardware devices 140. Scheduler(s) 240 ensure fair use of hardware device 140 between multiple client VMs 110. For example, scheduler(s) 240 support multiple client VMs 110 having concurrent access to a GPGPU, thereby providing a virtual GPGPU for each client VM 110 while maximizing the efficient use of the physical GPGPU. Additionally, GPGPU drivers often support concurrent application use of the GPGPU, via time-slicing. In one embodiment, appliance VM 112 includes at least one scheduler 240 per hardware device 140. In one embodiment, load balancer 235 tracks the load on hardware device(s) 140 to manage distribution of processes. In another embodiment, scheduler(s) 240 may give priority to system calls from on client VM 110 over another client VM 110.

At block 415, appliance VM 112 schedules the system call for execution by hardware device 140. For example, scheduler(s) 240 receive system calls from the load balancer and pass them, in turn, to appliance library 245. Appliance library 245 is the library originally intended to receive the system call generated by client application 215. In one embodiment, appliance library 245 is a CUDA™ library supporting the parallel computation architecture of the GPGPU.

At block 420, appliance VM 112 executes the system call. For example, appliance library 245 prepares the system call and any associated data, which may be received from client VM 110 or gathered from shared memory, and passes the system call to device driver 250. Relying upon device driver 250 within appliance VM 112, rather than a driver in the virtualization software layer, provides greater flexibility in supported operating systems/platforms for device drivers and the corresponding hardware devices. For example, vendors of hardware devices often generate and maintain device drivers for common computing platforms. Generation and maintenance of device drivers for a virtualization software layer, however, may be less common. Device driver 250 may further process the system call to generate an instruction for hardware device 140.

At block 425, appliance VM 112 instructs hardware device to perform a function according to the system call. For example, device driver 250 communicates directly with hardware device 140 via guest device pass-through. Guest device pass-through, e.g., is described in U.S. Pat. No. 7,945,436, which is incorporated by reference in its entirety. Continuing with the GPGPU example, using this approach, appliance VM 112 can include a standard CUDA™ or OpenCL™ driver and achieve performance from a GPGPU that is typically close to a non-virtualized implementation.

At block 430, appliance VM 112 transmits any result of hardware device 140 performing the function back to client VM 110.

Figure 5:
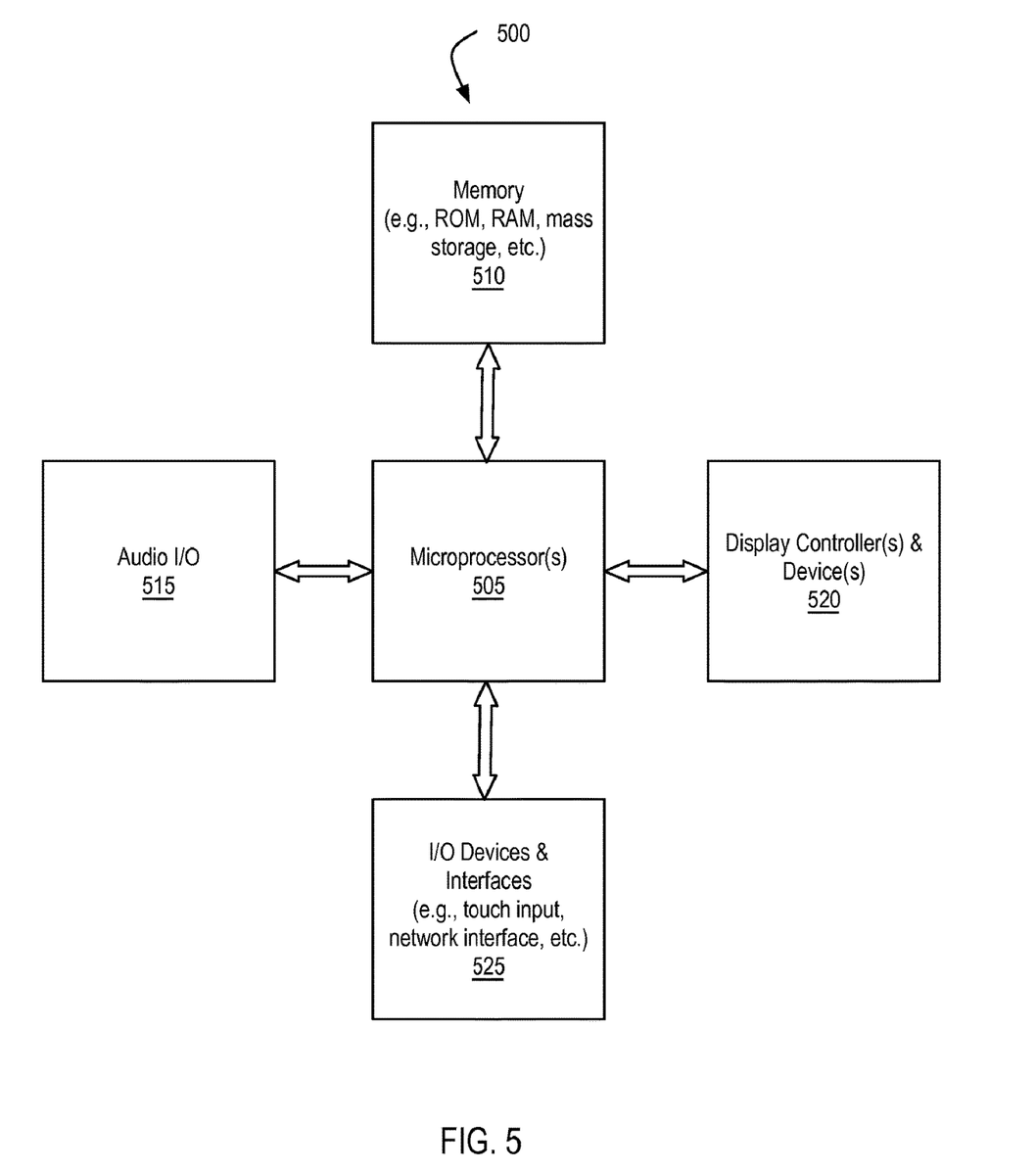
FIG. 5 illustrates, in block diagram form, an exemplary processing system to implement virtualization of a physical device.

FIG. 5 illustrates, in block diagram form, an exemplary processing system 500 to implement virtualization of a physical device. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 also includes audio input/output subsystem 515 which may include a microphone and/or a speaker for, for example, playing back music or other audio, receiving voice instructions to be executed by microprocessor(s) 505, playing audio notifications, etc. Display controller and display device 520 provides a visual user interface for the user.

Data processing system 500 also includes one or more input or output ("I/O") devices and interfaces 525, which are provided to allow a user to provide input to, receive output from, and otherwise transfer data to and from the system. I/O devices 525 may include a mouse, keypad or a keyboard, a touch panel or a multi-touch input panel, camera, optical scanner, network interface, modem, other known I/O devices or a combination of such I/O devices.

I/O devices and interfaces 525 may also include a port, connector for a dock, or a connector for a USB interface, FireWire, Thunderbolt, Ethernet, Fibre Channel, etc. to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

It will be appreciated that one or more buses, may be used to interconnect the various components shown in FIG. 5.

Data processing system 500 is an exemplary representation of one or more of the client device(s) 105, administrator device 106, host device(s) 130, and management server 135 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

It will be appreciated that additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented methods 300 and 400 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 525. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer implemented method, comprising processing a system call from an application running within a client virtual machine running on a first host device, wherein the processing includes:
   determining that the system call is a request for a device driver to instruct a physical general-purpose graphics processing unit (GPGPU) or a co-processor to perform a function and that the request is intended for a parallel computing framework library, wherein a first appliance virtual machine provides the parallel computing library and virtualization of the GPGPU or co-processor for a plurality of virtual machines including the client virtual machine, and wherein the parallel computing framework library comprises one of a compute unified device architecture (CUDA) framework library or an open computing language (OpenCL) framework library; and
   transmitting, in response to determining that the system call is intended for the parallel computing framework library, the request from the client virtual machine to the first appliance virtual machine to execute the request via a guest device pass-through that communicates directly with the GPGPU or co-processor.

2. The computer implemented method of claim 1, further comprising, selecting, the first appliance virtual machine based on one or more of (a) previous use of one or more appliance virtual machines, (b) load balancing between available appliance virtual machines, (c) latency in response from the available appliance virtual machines, or (d) co-location within a same host device as the client virtual machine.

3. The computer implemented method of claim 1, further comprising, upon receiving, by the first appliance virtual machine the request from the client virtual machine, load balancing the request between one or more schedulers based on use of the GPGPU or the co-processor by the client virtual machine and other client virtual machines.

4. The computer implemented method of claim 1, further comprising, prior to the transmitting, determining, in response to the system call, that an established connection between the client virtual machine and the first appliance virtual machine has switched from a first protocol to a second protocol, the first and second protocols including a high-performance transmission protocol and a low-performance transmission protocol.

5. The computer implemented method of claim 4, further comprising:
   determining that the second protocol has failed; and
   switching from the second protocol to a third protocol.

6. The computer implemented method of claim 4, wherein the established connection switches to the second protocol in response to the client virtual machine migrating to the first host device from a second host device.

7. The computer implemented method of claim 1, further comprising:
   selecting, in response to a detected latency in the first appliance virtual machine processing the transmitted request, a second appliance virtual machine to be a recipient of requests for a device driver to instruct a physical device to perform a function.

8. The method of claim 1, further comprising:
   before transmitting the request, establishing a connection with the first appliance virtual machine using one of a high-performance transmission protocol or a low-performance transmission protocol to communicate with the first appliance virtual machine.

9. The method of claim 1, wherein the parallel computing framework library comprises the OpenCL framework library.

10. A non-transitory computer-readable medium storing instructions, which when executed by one or more processors of a computing system, cause the computing system to perform operations comprising:
    processing a system call from an application running within a client virtual machine running on a first host device, wherein the processing comprises:
      determining that the system call is a request for a device driver to instruct a physical general-purpose graphics processing unit (GPGPU) or co-processor to perform a function and that the request is intended for a parallel computing framework library, wherein a first appliance virtual machine provides the parallel computing framework library and virtualization of the GPGPU or co-processor for a plurality of virtual machines including the client virtual machine, and wherein the first appliance virtual machine is selected for executing the system call based on a listing of hardware devices available to the client virtual machine;
      determining, by the client virtual machine, based on determining that the request is intended for the parallel computing framework library, to direct the request to an interceptor library associated with the client virtual machine and not to direct the request to the parallel computing framework library; and
      transmitting, based on directing the request to the interceptor library, the request from the client virtual machine to the first appliance virtual machine to execute the request via a guest device pass-through that communicates directly with the GPGPU or co-processor.

11. The non-transitory computer-readable medium of claim 10, wherein the operations further comprise, selecting, the first appliance virtual machine based on one or more of (a) previous use of one or more appliance virtual machines, (b) load balancing between available appliance virtual machines, (c) latency in response from the available appliance virtual machines, or (d) co-location within a same host device as the client virtual machine.

12. The non-transitory computer-readable medium of claim 10, wherein the operations further comprise, upon receiving, by the first appliance virtual machine the request from the client virtual machine, load balancing the request between one or more schedulers based on use of the GPGPU or the co-processor by the client virtual machine and other client virtual machines.

13. The non-transitory computer-readable medium of claim 10, wherein the operations further comprise, prior to the transmitting, determining, in response to the system call, that an established connection between the client virtual machine and the first appliance virtual machine has switched from a first protocol to a second protocol, the first and second protocols including a high-performance transmission protocol and a low-performance transmission protocol.

14. The non-transitory computer-readable medium of claim 13, wherein the operations further comprise:
   determining that the second protocol has failed; and
   switching from the second protocol to a third protocol.

15. The non-transitory computer-readable medium of claim 13, wherein the established connection switches to the second protocol in response to the client virtual machine migrating to the first host device from a second host device.

16. The non-transitory computer-readable medium of claim 10, wherein the operations further comprise:
   selecting, in response to a detected latency in the first appliance virtual machine processing the transmitted request, a second appliance virtual machine to be a recipient of requests for a device driver to instruct a physical device to perform a function.

17. An apparatus comprising:
   one or more processors; and
   at least one memory, the one or more processors and the at least one memory configured to:
   process a system call from an application running within a client virtual machine, wherein process the system call comprises to:
      determine that the system call is a request for a device driver to instruct a physical general-purpose graphics processing unit (GPGPU) or co-processor to perform a function and that the request is intended for a parallel computing framework library, wherein a first appliance virtual machine provides the parallel computing framework library and virtualization of the GPGPU or co-processor for a plurality of virtual machines including the client virtual machine, and wherein the first appliance virtual machine is selected for executing the system call based on a listing of hardware devices available to the client virtual machine;
      determine, by the client virtual machine, based on determining that the request is intended for the parallel computing framework library, to direct the request to an interceptor library associated with the client virtual machine and not to direct the request to the parallel computing framework library; and
      transmit, based on directing the request to the interceptor library, the request from the client virtual machine to the first appliance virtual machine to execute the request via a guest device pass-through that communicates directly with the GPGPU or co-processor.

18. The apparatus of claim 17, wherein to process the system call further comprises to, select, the first appliance virtual machine based on one or more of (a) previous use of one or more appliance virtual machines, (b) load balancing between available appliance virtual machines, (c) latency in response from the available appliance virtual machines, or (d) co-location within a same host device as the client virtual machine.

19. The apparatus of claim 17, wherein to process the system call further comprises to, upon receiving, by the first appliance virtual machine the request from the client virtual machine, load balance the request between one or more schedulers based on use of the GPGPU or the co-processor by the client virtual machine and other client virtual machines.

* * * * *